United States Patent
Kumaran et al.

(10) Patent No.: US 8,363,510 B2
(45) Date of Patent: Jan. 29, 2013

(54) DETECTION OF FEATURES IN SEISMIC IMAGES

(75) Inventors: Krishnan Kumaran, Raritan, NJ (US); Jingbo Wang, New York, NY (US)

(73) Assignee: ExxonMobil Upstream Research Company, Houston, TX (US)

( * ) Notice: Subject to any disclaimer, the term of this patent is extended or adjusted under 35 U.S.C. 154(b) by 379 days.

(21) Appl. No.: 12/741,133

(22) PCT Filed: Oct. 31, 2008

(86) PCT No.: PCT/US2008/081917
§ 371 (c)(1), (2), (4) Date: May 3, 2010

(87) PCT Pub. No.: WO2009/082545
PCT Pub. Date: Jul. 2, 2009

(65) Prior Publication Data
US 2010/0254219 A1 Oct. 7, 2010

Related U.S. Application Data

(60) Provisional application No. 61/008,758, filed on Dec. 21, 2007.

(51) Int. Cl.
*G01V 1/00* (2006.01)
(52) U.S. Cl. .......................................... 367/68; 702/15
(58) Field of Classification Search ............... 702/15; 367/68
See application file for complete search history.

(56) References Cited

U.S. PATENT DOCUMENTS

| | | |
|---|---|---|
| 5,473,697 A | 12/1995 | Ishihara |
| 5,940,778 A | 8/1999 | Marfurt et al. |
| 5,960,371 A | 9/1999 | Saito et al. |
| 5,987,388 A | 11/1999 | Crawford et al. |
| 5,992,519 A | 11/1999 | Ramakrishnan et al. |
| 6,018,498 A | 1/2000 | Neff et al. |
| 6,101,447 A | 8/2000 | Poe, Jr. |
| 6,125,203 A | 9/2000 | Keskes et al. |
| 6,625,544 B1 | 9/2003 | Laurent et al. |
| 7,069,149 B2 | 6/2006 | Goff et al. |
| 7,136,079 B2 | 11/2006 | Luo et al. |
| 7,136,510 B2 | 11/2006 | Van Ginkel et al. |

(Continued)

FOREIGN PATENT DOCUMENTS

| | | |
|---|---|---|
| GB | 2 439 1 82 | 12/2007 |
| WO | WO 00/16125 | 3/2000 |

(Continued)

OTHER PUBLICATIONS

Aminzadeh, F. (1987), "Pattern Recognition & Image Processing," Seismic Exploration, v. 20, pp. 66-67, 80-81, 345-347.

(Continued)

*Primary Examiner* — Mark Hellner
(74) *Attorney, Agent, or Firm* — ExxonMobil Upstream Research Company Law Dept.

(57) ABSTRACT

A computer implemented method for the detection of features such as faults or channels in seismic images. First, edges are detected in a smoothed seismic image (106). To detect a fault line, an image intensity of the edges is projected in multiple spatial directions, for example by performing a Radon transform (118). The directions of maximum intensity are used to define a fault line (124c). To detect channels, smooth curves are identified within the detected edges (810). Sets of parallel smooth curves (812a) are then identified and used to define channels (812).

25 Claims, 6 Drawing Sheets

U.S. PATENT DOCUMENTS

| | | | |
|---|---|---|---|
| 7,188,092 | B2 | 3/2007 | Wentland et al. |
| 7,203,342 | B2 | 4/2007 | Pedersen |
| 7,248,258 | B2 | 7/2007 | Acosta et al. |
| 7,295,706 | B2 | 11/2007 | Wentland et al. |
| 7,308,139 | B2 | 12/2007 | Wentland et al. |
| 7,796,469 | B2 * | 9/2010 | Keskes et al. .................. 367/72 |
| 2002/0035443 | A1 | 3/2002 | Matteucci et al. |
| 2002/0116131 | A1 | 8/2002 | Meek |
| 2005/0222774 | A1 | 10/2005 | Dulac et al. |
| 2006/0122780 | A1 | 6/2006 | Cohen et al. |
| 2007/0179767 | A1 | 8/2007 | Cullick et al. |

FOREIGN PATENT DOCUMENTS

WO    WO 2004/038654      5/2004

OTHER PUBLICATIONS

Amir, A. et al. (1998), "A Generic Grouping Algorithm and its Quantitative Analysis," IEE Transactions on Pattern Analysis and Machine Intelligence, v. 20, No. 2, pp. 168-185.

Antonelli, P. et al. (2004), "A principal component noise filter for high spectral resolution infrared measurements," Journal of Geophysical Research, v. 109, D23102, 22 pgs.

Bakker, P. (2002) "Image Structure Analysis for Seismic Interpretation," PhD Thesis, TU Delft, The Netherlands, Chapter 2, Section 6.1, pp. 97-102.

Bezdek, J.C. (1993), "Review of PR image segmentation techniques using pattern recognition", Medical Physics, v. 20(4), pp. 1033-1048.

Brady, M. et al. (1982), "The Perception of Subjective Surfaces," A.I. Memo No. 666, Artificial Intelligence Laboratory, MIT, 48 pages.

Burges, C. J. C. (1998), "A Tutorial on Support Vector Machines for Pattern Recognition," Data Mining and Knowledge Discovery, v. 2(2), pp. 121-167.

Cheng, H. D. et al. (2001), "Color Image Segmentation: Advances and Prospects," Pattern Recognition, v. 34(12), pp. 2259-2281.

Doughtery, E. R. et al. (2002), "Pattern Recognition Theory in Nonlinear Signal Processing," Journal of Mathematical Imaging and Vision, v. 16(3), pp. 181-197.

Egmont-Petersen, M. et al. (2002), "Image Processing With Neutral Networks—A Review," Pattern Recongnition, v. 35(10), pp. 2279-2301.

Gibson, D. et al. (2003), "Automatic Fault Detection for 3D Seismic Data," Proc. VII$^{th}$ Digital Image Computing: Techniques and Applications, pp. 821-830.

Guy, G. et al. (1992), "Inferring Global Perceptual Contours from Local Features," Proc. Image Understanding Workshop DRPA, pp. 113-133.

Jain, A. K. et al. (1999), "Data Clustering: A Review," ACM Computing Surveys, v. 31(3), pp. 264-323.

Kumaran, K. et al. (1995), "Model of visual organization," pp. 55-60.

Kumaran, K. et al. (1996), "Illusory Surface Perception and Visual Organization,"Network: Computation in Neural Systems, v. 7(1), pp. 33-60.

Loncaric, S. A. (1998), "Survey of Shape Analysis Techniques," Pattern Recognition, v. 31(8), pp. 983-1001.

Poe, B.D. et al. (2006), "Characterization of Multilayer Reservoir Properties Using Production Logs," SPE 101721, 2006 SPE Russian Oil and Gas Technical Conf. & Exh., Moscow, Russia, Oct. 3-6, 2006, 15 pgs.

Rahman, N.M.A. et al. (2007), "A New Approach for Interpreting Pressure Data to Estimate Key Reservoir Parameters from Closed-Chamber Tests," SPE 109860, 2007 SPE Annual Technical Conf. & Exh., Anaheim, CA, Nov. 11-14, 2007, 19 pgs.

Rohr, K. (2001), "Landmark-based image analysis," Kluwer Academic Publishers, XP002499833, pp. 52-54.

Schaffalitzky, F. et al. (1999), "Geometric Grouping of Repeated Elements Within Images," Lecture Notes in Computer Science, v. 1681, pp. 165-181.

Spivey, J.P. et al. (2006), "Estimating Layer Properties for Wells in Multilayer Low-Permeability Gas Reservoirs by Automatic History-Matching Production and Production Log Data," SPE 100509, 2006 SPE Gas Technology Symposium, Calgary, Alberta, Canada, May 15-17, 2006, 13 pgs.

*European Search Report*, dated Jul. 11, 2008, EP08002836.8.

*European Search Report*, dated Oct. 9, 2008, EP08002836.8.

*Int'l. Search Report and Written Opinion*, dated Jan. 26, 2009, PCT/US08/81917.

\* cited by examiner

DETECTION OF FEATURES IN SEISMIC IMAGES

This application is the National Stage under 35 U.S.C. 371 of PCT/US2008/081917 that was published as WO 2009/082545 and was filed on 31 Oct. 2008, which claims the benefit of U.S. Provisional Application No. 61/008,758, filed 21 Dec. 2007, which is incorporated herein by reference, in its entirety, for all purposes.

BACKGROUND OF THE INVENTION

This invention relates generally to oil and gas production, and in particular to the processing of seismic data to facilitate oil and gas production.

Existing interpretation of seismic data faces a number of significant challenges. First, undiscovered oil and gas reservoirs are often contained in subtle traps at very low depth or in stratigraphic traps that are difficult to detect in a single seismic volume. Second, the amount of seismic data and attributes that can now be obtained for each seismic volume typically far exceeds the interpretation capability of human interpreters. As a result, a number of methods have been developed for automatically processing seismic data to facilitate the interpretation of the seismic data.

For example, there are a number of existing methods for applying pattern recognition and data mining techniques to seismic data. However, many of the existing methods have been limited to pre-processing seismic images to remove noise and/or utilize horizon tracking using local classification methods. In other instances, the existing methods provide automatic identification of geological features by relying upon training neural networks and other similar classifiers. Such existing methods for identifying geological features in seismic data are indirect and lack transparency.

DETAILED DESCRIPTION OF THE ILLUSTRATIVE EMBODIMENTS

Figure 1A:
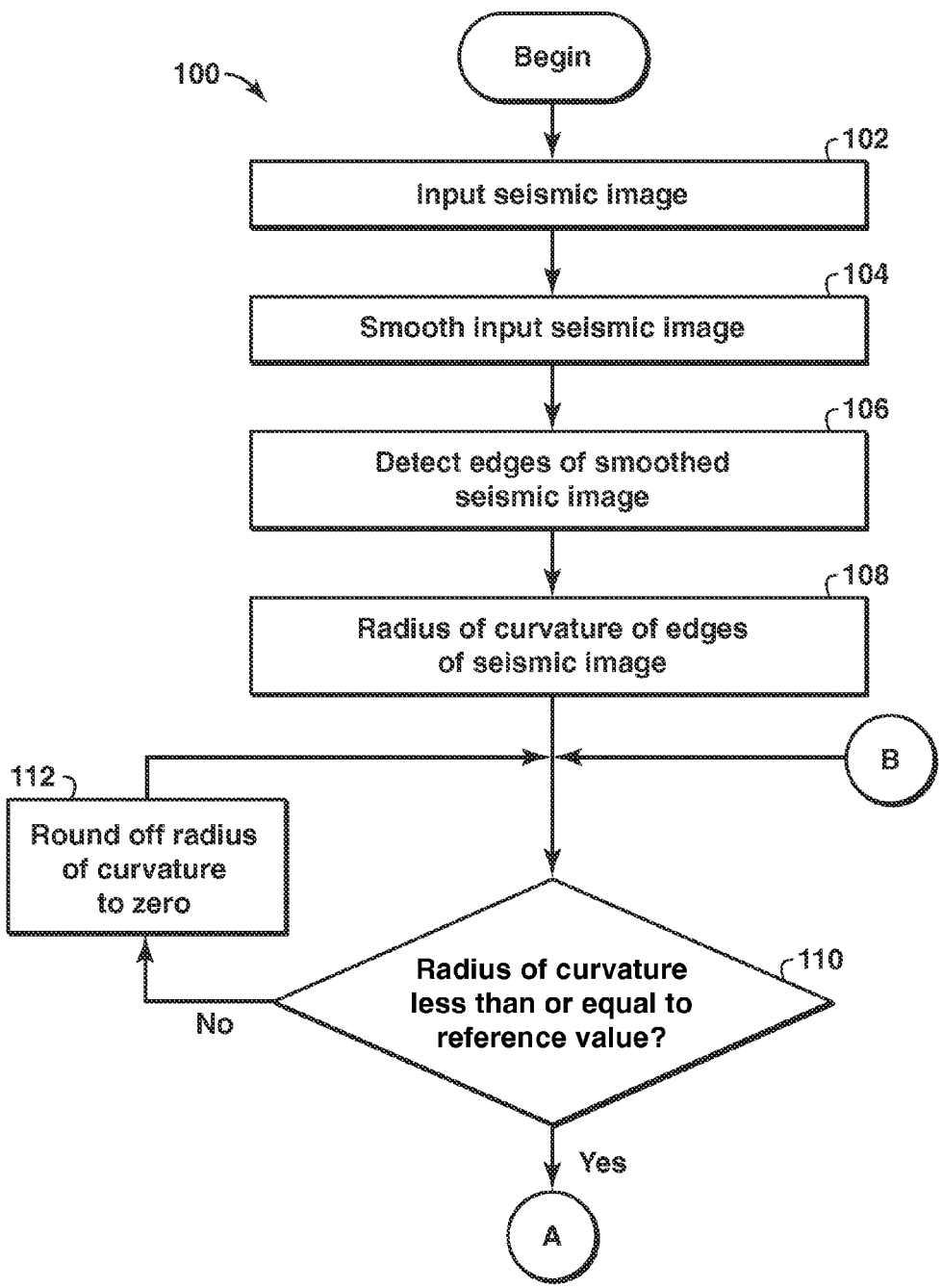
FIGS. 1a and 1b are flow chart representations of an exemplary embodiment of a method of determining the presence of a fault in a seismic image.
Figure 1B:
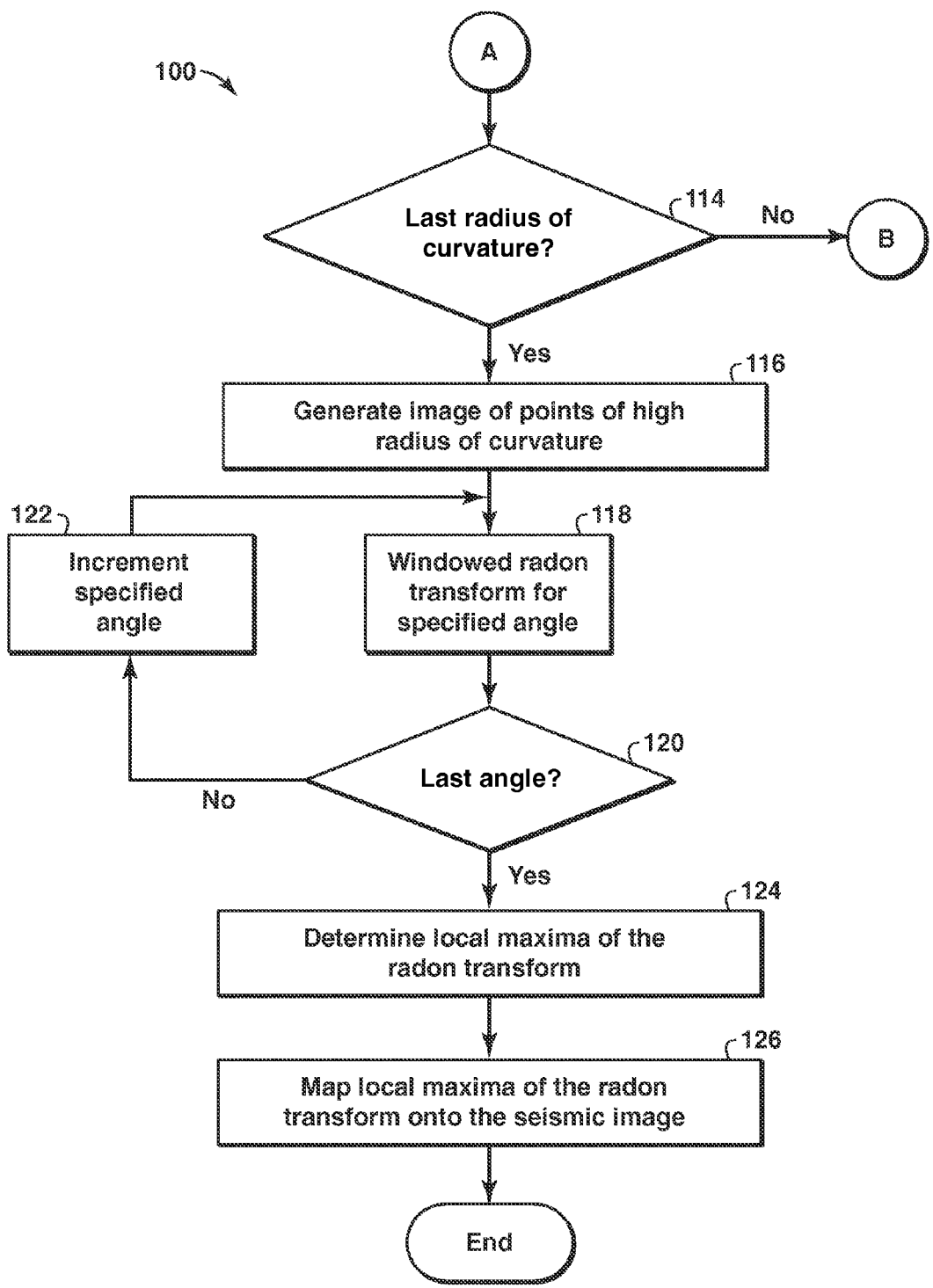
Figure 2:
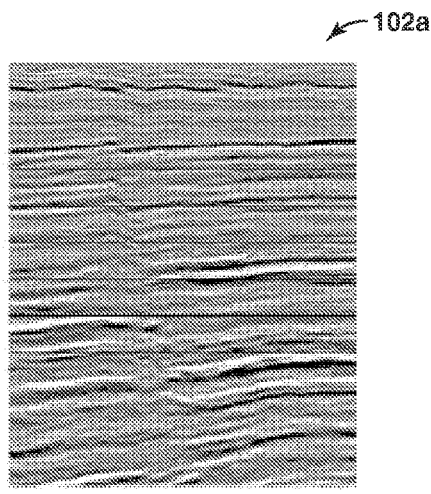
FIG. 2 is a graphical illustration of an exemplary embodiment of a seismic image.
Figure 3:
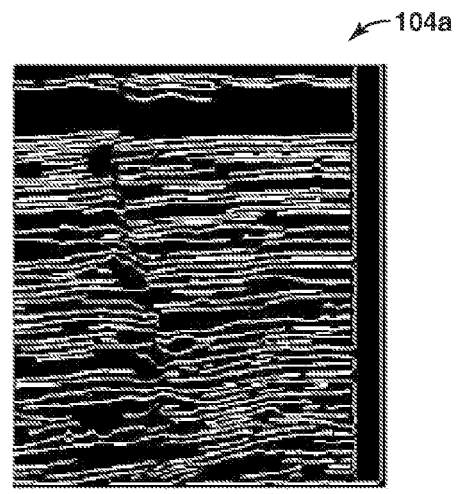
FIG. 3 is a graphical illustration of the seismic image of FIG. 2 after smoothing the seismic image.
Figure 4:
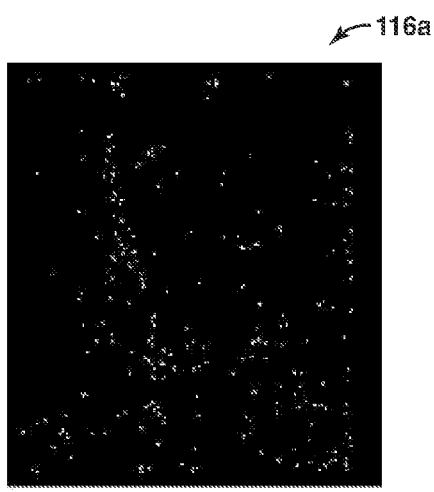
FIG. 4 is a graphical illustration of the seismic image of FIG. 3 after detecting the points of high radius of curvature in the smoothed seismic image.
Figure 5:
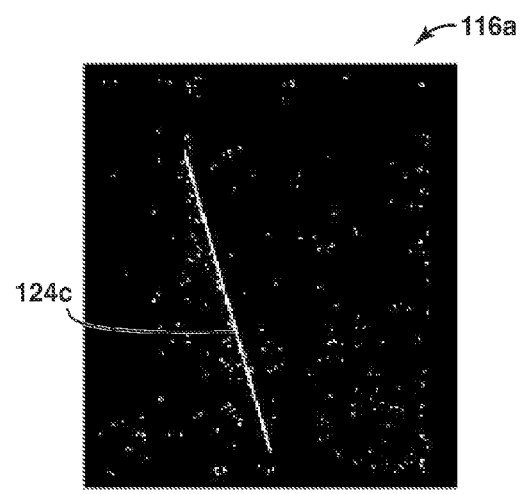
FIG. 5 is a graphical illustration of a fault line in the image of FIG. 4.
Figure 6:
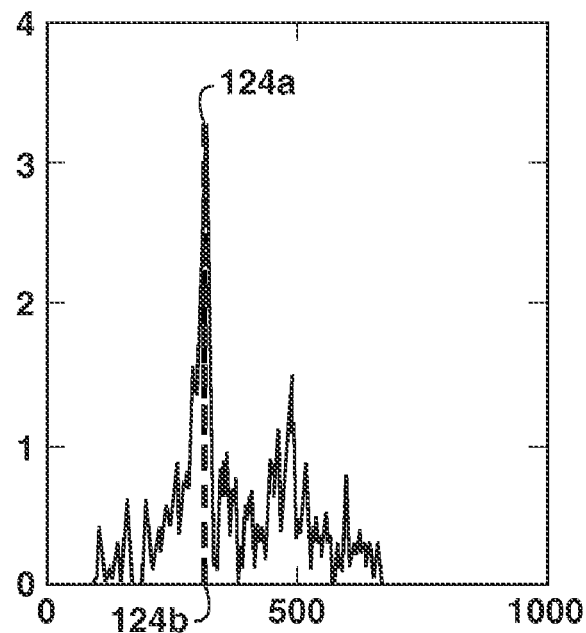
FIG. 6 is a graphical illustration of Radon transforms performed on the image of FIG. 4.
Figure 7:
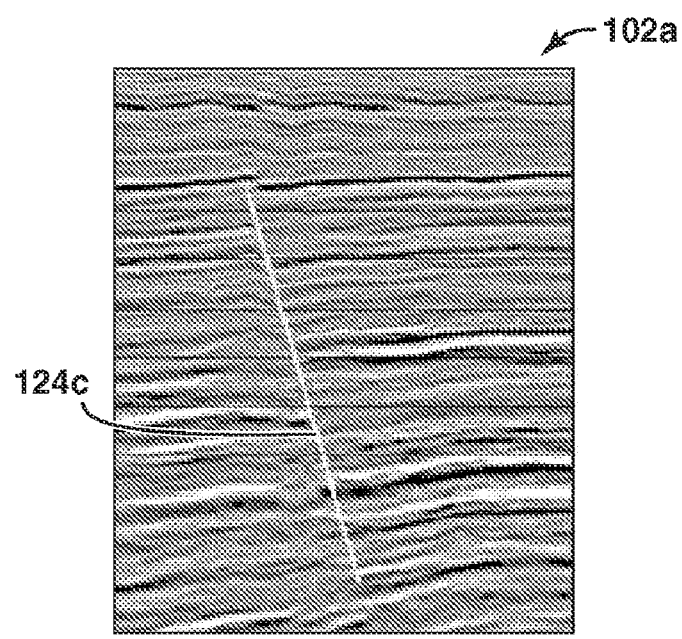
FIG. 7 is a graphical illustration of the seismic image of FIG. 2 including a fault line.

Referring to FIGS. 1a, 1b, 2, 3, 4, 5, 6, and 7, an exemplary embodiment of a method 100 of detecting faults in seismic images is provided in which a seismic image 102a is input in 102. In an exemplary embodiment, the input seismic image 102a is then smoothed in 104 to generate a smoothed seismic image 104a. In an exemplary embodiment, the smoothed seismic image 104a is generated in 104 using conventional methodologies for smoothing multi-dimensional data such as, for example, methodologies for the filtering of random noise from multi-dimensional data.

In an exemplary embodiment, the smoothed seismic image 104a is then processed to determine edges within the smoothed seismic image in 106. In an exemplary embodiment, the determination of edges within the smoothed seismic image 104a is provided in 106 using conventional methodologies for determining edges in multi-dimensional data such as, for example, the Canny or Sobel edge detection methodologies. In an exemplary embodiment, the radius of curvature of the determined edges are then determined in 108. In an exemplary embodiment, the radius of curvature determined in 108 is the iso-contour radius of curvature of the smoothed seismic image 104a. The iso-contour radius of curvature of the determined edge refers to the radius of curvature of the edge determined in 106.

In an exemplary embodiment, the method 100 then determines the points of high radius of curvature in the smoothed seismic image by determining, for each edge, whether or not the radius of curvature of the edge is less than or equal to a predetermined reference value R(x,y) in 110. If the radius of curvature of the edge is not less than or equal to the predetermined reference value R(x,y), then the radius of curvature for the edge is rounded off to be equal to zero in 112. If the last edge having a non-zero radius of curvature has been processed by 110 and 112, then the determination of the points of high radius of curvature is ended in 114 and the method 100 then generates an image of the points of high radius of curvature 116a in 116.

In an exemplary embodiment, the method 100 then performs a windowed Radon transform for a range of angular directions on the image of the points of high radius of curvature 116a in 118, 120, and 122. In an exemplary embodiment, the Radon transform utilized in 118 may be a conventional Radon transform. Alternatively, other similar transforms such as, for example, a Hough transform, may also be used in 118. In an exemplary embodiment, the window size for the Radon, or equivalent, transform, in 118 may help to control errors in due to potential small misalignments and/or some level of curviness in the faults determined by the method 100. In an exemplary embodiment, the window size used in the Radon, or equivalent, transform, in 118 should be set to be equal to a small multiple of the horizon spacing of the seismic image 102a.

In an exemplary embodiment, the method 100 then determines the local maxima 124a of the results of the Radon transform results generated in 118, 120, and 122 in 124. In an exemplary embodiment, the local maxima 124a of the Radon transform results is associated with a corresponding angular direction 124b and a fault line 124c within the seismic image 102a and the image of the points of high radius of curvature 116a.

In an exemplary embodiment, the method 100 then maps the fault line 124c onto the seismic image 102a in 126.

In an exemplary embodiment, the teachings of the method 100 may be applied to seismic images having N-dimensions.

In an exemplary embodiment, the method 100 may be used to determine one or more fault lines.

In an exemplary embodiment, in the method 100, grouping algorithms may be used in combination with Radon and/or Hough transforms in order to enhance the determination of fault lines.

In an exemplary embodiment, in the method 100, contextual geological may be used such as, for example, proximity to other geological structures and constraints on orientation based upon rock physics, may be used to enhance the determination of fault lines.

In an exemplary embodiment, the method 100 may be used to determine linear, non-linear, or curvilinear fault lines. In an exemplary embodiment, the determination of curvilinear faults lines by the method 100 may be enhanced by the use of grouping algorithms that generalize the Radon, or equivalent, transform. In an exemplary embodiment, such grouping algorithms search for smooth curves in scattered binary data.

Figure 8:
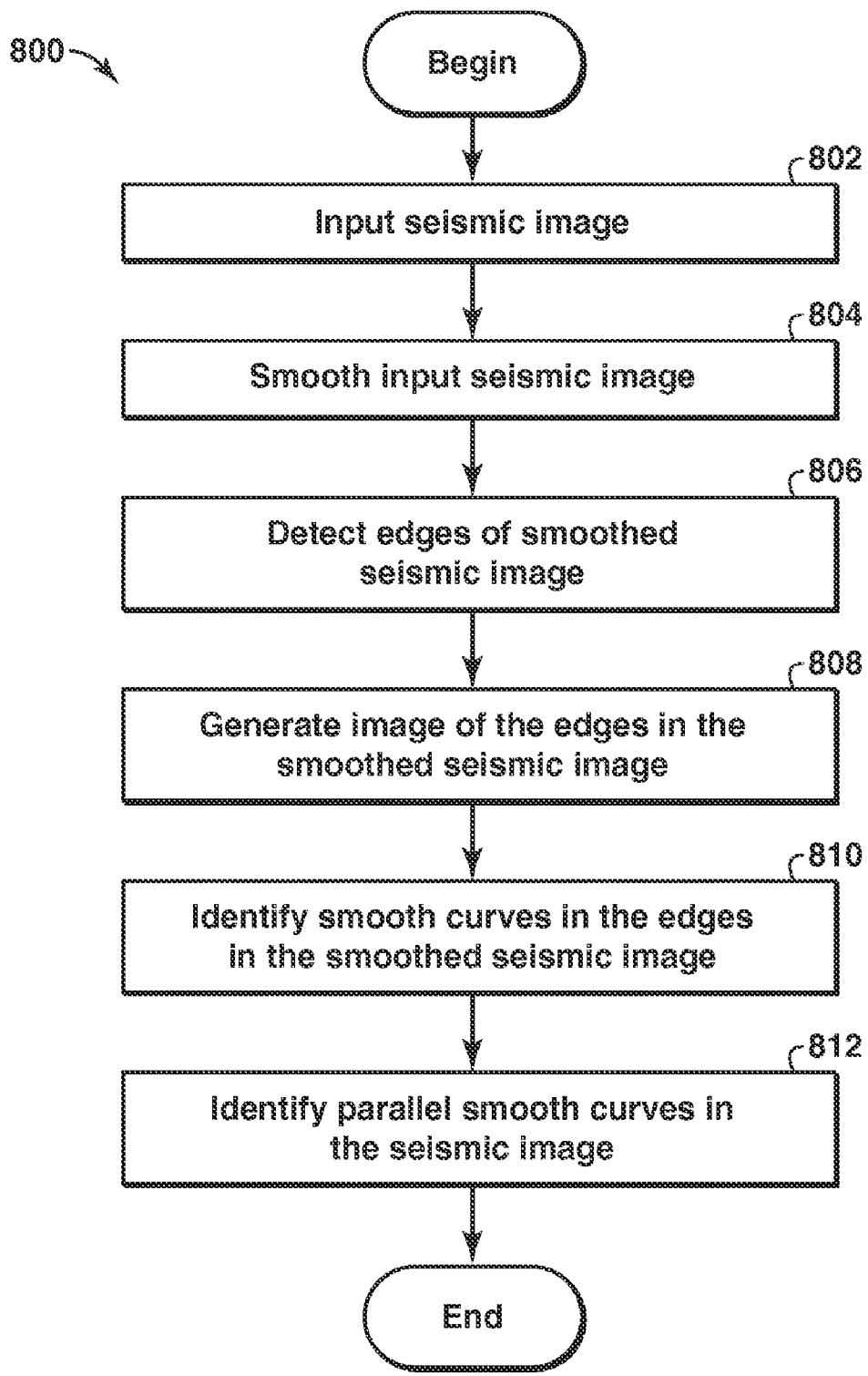
FIG. 8 is a flow chart representation of an exemplary embodiment of a method of determining the presence of channels in a seismic image.
Figure 9:
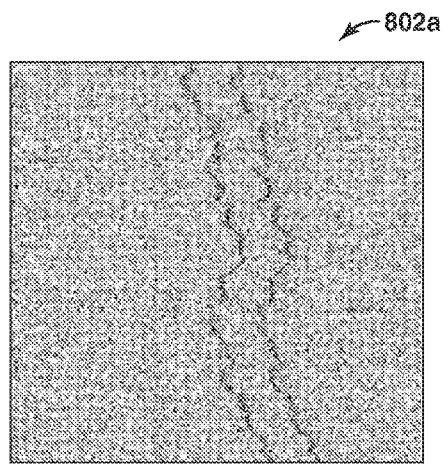
FIG. 9 is a graphical illustration of an exemplary embodiment of a seismic image.
Figure 10:
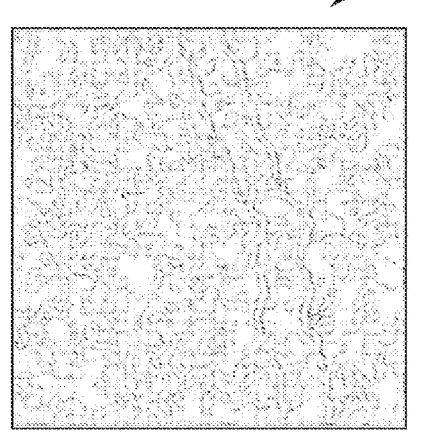
FIG. 10 is a graphical illustration of the seismic image of FIG. 9 after smoothing the seismic image.
Figure 11:
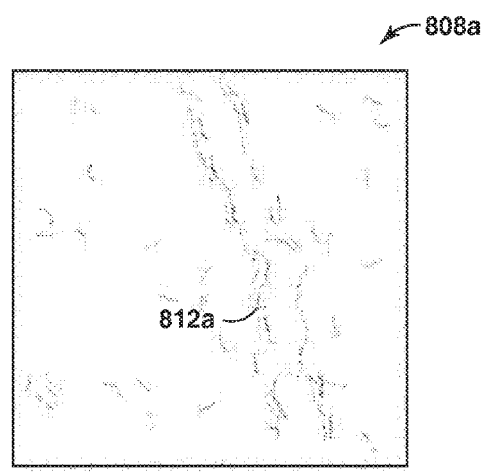
FIG. 11 is a graphical illustration of the smoothed seismic image of FIG. 10 after processing the image to determine channels in the image.

Referring now to FIGS. 8, 9, 10 and 11, an exemplary embodiment of a method 800 of determining channels in seismic images is provided in which in 802 a seismic image 802a is input.

In an exemplary embodiment, the method 800 then smooths the seismic image 802 in 804, and detects edges in the smoothed seismic image in 806. In an exemplary embodiment, the method 800 then generates an image 808a of the edges in the smoothed seismic image in 808.

In an exemplary embodiment, the method 800 then identifies smooth curves in the edges of the smoothed seismic image 808a in 810. In an exemplary embodiment, the method 800 then identifies parallel smooth curves 812a in the smoothed seismic image 808a in 812. In an exemplary embodiment, the parallel smooth curves 812a define channels in the smoothed seismic image 808a.

In an exemplary embodiment, the teachings of the method 800 may be applied to seismic images having N-dimensions.

In an exemplary embodiment, the method 800 may be used to determine one or more channels.

In an exemplary embodiment, in the method 800, grouping algorithms may be used in order to enhance the determination of channels.

In an exemplary embodiment, in the method 800, contextual geological may be used such as, for example, proximity to other geological structures and constraints on orientation based upon rock physics, may be used to enhance the determination of channels.

In an exemplary embodiment, the method 800 may be used to determine linear, non-linear, or curvilinear channels. In an exemplary embodiment, the determination of curvilinear channels by the method 800 may be enhanced by the use of grouping algorithms. In an exemplary embodiment, such grouping algorithms search for smooth curves in scattered binary data.

In an exemplary embodiment, the smoothing operations, 104 and 804, of the methods 100 and 800 may be implemented using one or more conventional techniques for reducing noise in an image. In an exemplary embodiment, the filtering provided in the smoothing operations, 104 and 804, of the methods 100 and 800 may, for example, include specifying a window size, specifying a filter matrix of the specified window size that defines a local averaging technique, and performing a convolution for each pixel of the image. In an exemplary embodiment, the filtering provided in the smoothing operations, 104 and 804, of the methods 100 and 800 may, for example, include anisotropic methods for smoothing the seismic images.

In an exemplary embodiment, the edge detection operations, 106 and 806, of the methods, 100 and 800, may, for example, include techniques for detecting discontinuities along spatial directions in an image. In an exemplary embodiment, such techniques for detecting discontinuities along spatial directions calculate the spatial derivatives of an image and search for sharp changes in the spatial derivatives. Examples of techniques for detecting discontinuities along spatial directions include the Sobel and Canny, the selection of which may depend upon the different continuous representations of the associated convolution operators.

In an exemplary embodiment, the determination of the radius of curvature operation 108 of the method 100 may be provided, for 2-dimensional images, using the following equation for determining the iso-contour curvature R(x,y) of a 2-dimensional function I(x,y) as follows:

$$R(x, y) = \left| \frac{(I_x^2 + I_y^2)^{3/2}}{I_{xx}I_y^2 + I_{yy}I_x^2 - 2I_xI_yI_{xy}} \right| \quad (1)$$

where:

$$I_x \equiv \frac{\partial I}{\partial x};$$

$$I_y \equiv \frac{\partial I}{\partial y};$$

$$I_{xx} \equiv \frac{\partial^2 I}{\partial x \partial x};$$

$$I_{yy} \equiv \frac{\partial^2 I}{\partial y \partial y}; \text{ and}$$

$$I_{xy} \equiv \frac{\partial^2 I}{\partial x \partial y}.$$

In an exemplary embodiment, the Radon transformation operation 118 of the method 100 provides a projection of the image intensity along straight lines in all possible directions and orientations. In an exemplary embodiment, other transformations that provide an indication of the image intensity in one or more spatial directions, may be used instead of, or in addition to the Radon transformation.

In an exemplary embodiment, one or more of the operations of the methods 100 and 800 include clustering and/or grouping operations in order to enhance the processing of the seismic images in order to determine non-linear and/or curvilinear faults and/or channels in the seismic images. In an exemplary embodiment, during the operation of the methods 100 and 800, edge segments are obtained by segmentation algorithms that break up edges into edge segments. In an exemplary embodiment, grouping operations are included in the implementation of the methods 100 and 800 in order to group such edge segments into meaningful geometries. In an exemplary embodiment, the edge segments may be clustered into coherent groups. In this exemplary embodiment, the edge segments that are associated with the same cluster may indicate the presence of boundaries of a geological feature.

A method of determining the presence of one or more faults within a seismic image has been described that includes inputting a seismic image; smoothing the input seismic image; detecting edges in the smoothed seismic image; projecting an intensity of the edges in a plurality of spatial directions; determining a direction of maximum intensity of the projections of the edges; and for the directions of maximum intensity defining a fault line in the seismic image. In an exemplary embodiment, detecting edges in the smoothed seismic image comprises detecting edges having a radius of curvature greater than a predetermined value. In an exemplary embodiment, detecting edges in the smoothed seismic image comprises detecting edges having a radius of curvature less than or equal to a predetermined value. In an exemplary embodiment, detecting edges in the smoothed seismic image comprises detecting edges having a radius of curvature less than or equal to a predetermined value; and setting the radius of curvature of the edges having a radius of curvature less than or equal to a predetermined value equal to zero. In an exemplary embodiment, detecting edges in the smoothed seismic image comprises detecting edges having a radius of curvature greater than a predetermined value; detecting edges having a radius of curvature less than or equal to a predetermined value; and setting the radius of curvature of the edges having a radius of curvature less than or equal to a predetermined value equal to zero. In an exemplary embodiment, projecting an intensity of the edges in a plurality of spatial directions comprises performing a Radon transform on the seismic image. In an exemplary embodiment, determining a direction of maximum intensity of the projections of the edges comprises determining a local maxima of the Radon transform. In an exemplary embodiment, the fault line comprises a linear fault line. In an exemplary embodiment, the fault line comprises a non-linear fault line. In an exemplary embodiment, the fault line comprises a curvilinear fault line. In an exemplary embodiment, the method further comprises searching for smooth curves in the seismic image. In an exemplary embodiment, the seismic image comprises an n-dimensional image, where n is greater than or equal to 2. In an exemplary embodiment, smoothing the input seismic image comprises filtering noise from the input seismic image. In an exemplary embodiment, filtering noise from the input seismic image comprises specifying a filter window size; specifying a filter matrix; and performing a convolution for each pixel of the input seismic image. In an exemplary embodiment, filtering noise from the input seismic image comprises anisotropically filtering noise from the input seismic image. In an exemplary embodiment, detecting edges in the smoothed seismic image comprises calculating spatial derivatives in the smoothed seismic image. In an exemplary embodiment, detecting edges in the smoothed seismic image comprises determining a radius of curvature of edges within the smoothed seismic image. In an exemplary embodiment, determining a radius of curvature of edges within the smoothed seismic image comprises determining an iso-contour curvature of edges within the smoothed seismic image. In an exemplary embodiment, determining an iso-contour curvature of edges within the smoothed seismic image comprises determining an iso-contour curvature of edges $R(x,y)$ of a 2-dimensional function $I(x,y)$ within the smoothed seismic image using the following equation:

$$R(x, y) = \left| \frac{(I_x^2 + I_y^2)^{3/2}}{I_{xx}I_y^2 + I_{yy}I_x^2 - 2I_xI_yI_{xy}} \right|.$$

A method of determining the presence of one or more faults within a seismic image has been described that includes inputting a seismic image; smoothing the input seismic image; detecting edges in the smoothed seismic image; determining edges within the smoothed seismic image having a large radius of curvature; generating an image of the large radius of curvature edges; projecting an intensity of the image of the large radius of curvature edges in a plurality of spatial directions; determining a direction of maximum intensity of the projections of the image of the large radius of curvature edges; and for the directions of maximum intensity defining a fault line in the seismic image.

A method of determining the presence of one or more channels within a seismic image has been described that includes inputting a seismic image; smoothing the input seismic image; detecting edges in the smoothed seismic image; identifying smooth curves within the detected edges of the smoothed seismic image; identifying one or more sets of parallel smooth curves in the smoothed seismic image; and for the sets of parallel smooth curves defining one or more channels in the seismic image. In an exemplary embodiment, the channels comprise linear channels. In an exemplary embodiment, the channels comprise non-linear channels. In an exemplary embodiment, the channels comprise curvilinear channels. In an exemplary embodiment, the method further includes searching for smooth curves in the seismic image. In an exemplary embodiment, the seismic image comprises an n-dimensional image, where n is greater than or equal to 2. In an exemplary embodiment, smoothing the input seismic image comprises filtering noise from the input seismic image. In an exemplary embodiment, filtering noise from the input seismic image comprises specifying a filter window size; specifying a filter matrix; and performing a convolution for each pixel of the input seismic image. In an exemplary embodiment, filtering noise from the input seismic image comprises anisotropically filtering noise from the input seismic image. In an exemplary embodiment, detecting edges in the smoothed seismic image comprises calculating spatial derivatives in the smoothed seismic image.

It is understood that variations may be made in the foregoing without departing from the scope of the invention. Furthermore, the elements and teachings of the various illustrative embodiments may be combined in whole or in part in some or all of the illustrative embodiments. In addition, one or more of the elements and teachings of the various illustrative embodiments may be omitted, at least in part, and/or combined, at least in part, with one or more of the other elements and teachings of the various illustrative embodiments.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A computer implemented method of determining the presence of one or more faults within a seismic image, comprising:
inputting a seismic image;
smoothing the input seismic image;
detecting edges in the smoothed seismic image;
projecting an intensity of the edges in a plurality of spatial directions;
determining a direction of maximum intensity of the projections of the edges; and
for the directions of maximum intensity defining a fault line in the seismic image.

2. The method of claim 1, wherein detecting edges in the smoothed seismic image comprises:
detecting edges having a radius of curvature greater than a predetermined value.

3. The method of claim 1, wherein detecting edges in the smoothed seismic image comprises:

detecting edges having a radius of curvature less than or equal to a predetermined value.

4. The method of claim 3, wherein detecting edges in the smoothed seismic image comprises:
detecting edges having a radius of curvature less than or equal to a predetermined value; and
setting the radius of curvature of the edges having a radius of curvature less than or equal to a predetermined value equal to zero.

5. The method of claim 1, wherein detecting edges in the smoothed seismic image comprises:
detecting edges having a radius of curvature greater than a predetermined value;
detecting edges having a radius of curvature less than or equal to a predetermined value; and
setting the radius of curvature of the edges having a radius of curvature less than or equal to a predetermined value equal to zero.

6. The method of claim 1, wherein projecting an intensity of the edges in a plurality of spatial directions comprises:
performing a Radon transform on the seismic image.

7. The method of claim 6, wherein determining a direction of maximum intensity of the projections of the edges comprises:
determining local maxima of the Radon transform.

8. The method of claim 1, further comprising:
searching for smooth curves in the seismic image.

9. The method of claim 1, wherein the seismic image comprises an n-dimensional image, where n is greater than or equal to 2.

10. The method of claim 1, wherein smoothing the input seismic image comprises:
filtering noise from the input seismic image.

11. The method of claim 10, wherein filtering noise from the input seismic image comprises:
specifying a filter window size;
specifying a filter matrix; and
performing a convolution for each pixel of the input seismic image.

12. The method of claim 10, wherein filtering noise from the input seismic image comprises:
anisotropically filtering noise from the input seismic image.

13. The method of claim 1, wherein detecting edges in the smoothed seismic image comprises:
calculating spatial derivatives in the smoothed seismic image.

14. The method of claim 1, wherein detecting edges in the smoothed seismic image comprises:
determining a radius of curvature of edges within the smoothed seismic image.

15. The method of claim 14, wherein determining a radius of curvature of edges within the smoothed seismic image comprises:
determining an iso-contour curvature of edges within the smoothed seismic image.

16. The method of claim 15, wherein determining an iso-contour curvature of edges within the smoothed seismic image comprises:
determining an iso-contour curvature of edges R(x,y) of a 2-dimensional function I(x,y) within the smoothed seismic image using the following equation:

$$R(x, y) = \left| \frac{(I_x^2 + I_y^2)^{3/2}}{I_{xx}I_y^2 + I_{yy}I_x^2 - 2I_xI_yI_{xy}} \right|.$$

17. A computer implemented method of determining the presence of one or more channels within a seismic image, comprising:
inputting a seismic image;
smoothing the input seismic image;
detecting edges in the smoothed seismic image;
identifying smooth curves within the detected edges of the smoothed seismic image;
identifying one or more sets of parallel smooth curves in the smoothed seismic image; and
for the sets of parallel smooth curves defining one or more channels in the seismic image.

18. The method of claim 17, further comprising:
searching for smooth curves in the seismic image.

19. The method of claim 17, wherein the seismic image comprises an n-dimensional image, where n is greater than or equal to 2.

20. The method of claim 17, wherein smoothing the input seismic image comprises:
filtering noise from the input seismic image.

21. The method of claim 20, wherein filtering noise from the input seismic image comprises:
specifying a filter window size;
specifying a filter matrix; and
performing a convolution for each pixel of the input seismic image.

22. The method of claim 20, wherein filtering noise from the input seismic image comprises:
anisotropically filtering noise from the input seismic image.

23. The method of claim 17, wherein detecting edges in the smoothed seismic image comprises:
calculating spatial derivatives in the smoothed seismic image.

24. A computer implemented method of determining the presence of one or more faults within a seismic image, comprising:
inputting a seismic image;
smoothing the input seismic image;
detecting edges in the smoothed seismic image;
determining an iso-contour curvature of edges within the smoothed seismic image; and
determining one or more fault lines from the iso-contour curvature.

25. The method of claim 24, further comprising:
co-rendering the iso-contour curvature with the seismic image; and
determining one or more fault lines from the co-rendering.

* * * * *